United States Patent [19]
Southwell et al.

[11] Patent Number: 4,756,602
[45] Date of Patent: Jul. 12, 1988

[54] NARROWBAND OPTICAL FILTER WITH PARTITIONED CAVITY

[75] Inventors: William H. Southwell, Thousand Oaks; William J. Gunning, Newbury Park, both of Calif.

[73] Assignee: Rockwell International Corporation, El Segundo, Calif.

[21] Appl. No.: 58,495

[22] Filed: Jun. 5, 1987

[51] Int. Cl.$^4$ .............................................. G02B 5/28
[52] U.S. Cl. ..................................... 350/166; 350/1.6
[58] Field of Search ................................ 350/166, 1.6

[56] References Cited

U.S. PATENT DOCUMENTS

| | | | |
|---|---|---|---|
| 3,039,362 | 6/1962 | Dobrowolski | 350/166 |
| 3,579,130 | 5/1971 | Smiley | 350/166 |
| 4,583,822 | 4/1986 | Southwell | 350/164 |
| 4,666,250 | 5/1987 | Southwell | 350/166 |

OTHER PUBLICATIONS

Berning, "Use of Equivalent Films in the Design of Infrared Multilayer Anti-Reflection Coatings," *J. of the Optical Soc. of America*, vol. 52 No. 4, pp. 431–436 (1962).
Epstein, "The Design of Optical Filters," *Journal of the Optical Society of America*, vol. 42 No. 11, pp. 806–810 (1952).
Southwell, "Coating Design Using Very Thin High- -and Low-Index Layers," *Applied Optics*, vol. 24 No. 4, pp. 457–460 (1985).
Southwell, "Gradient-Index Antireflection Coatings", *Optics Letters*, vol. 8 No. 11, pp. 584–586 (Nov. 1983).
Yadava et al., "Optical Behavior of Gradient-Index Multilayer Films," *Thin Solid Films*, vol. 21, pp. 297–312 (1974).

Primary Examiner—Bruce Y. Arnold
Attorney, Agent, or Firm—Hamann H. Fredrick; Craig O. Malin; John J. Deinken

[57] ABSTRACT

A method of designing a thin film optical bandpass filter, for transmitting light in a narrow band of wavelengths centered about a bandpass wavelength, begins by defining a first quarter-wave stack, including a first plurality of layers each having an optical thickness equal to one fourth the bandpass wavelength. A second quarter-wave stack includes a second plurality of layers each having an optical thickness equal to one fourth the bandpass wavelength. Next, a cavity layer is defined with an optical thickness equal to an integral multiple of one half the bandpass wavelength, to be interposed between the first quarter-wave stack and the second quarter-wave stack. The cavity layer is then replaced with a partitioned cavity, including at least one layer of a first optical material with a relatively high index of rfraction and at least one layer of a second optical material with a relatively low index of refraction. The partitioned cavity layers, which initially have a total optical thickness equivalent to the optical thickness of the cavity layer, are adjusted in physical thickness to center the transmission peak of the filter on the bandpass wavelength. Thin film optical bandpass filters produced according to the method are also disclosed.

15 Claims, 9 Drawing Sheets

NARROWBAND OPTICAL FILTER WITH PARTITIONED CAVITY

BACKGROUND OF THE INVENTION

This invention relates to the design of optical coatings for controlling the manner in which light of particular wavelengths is transmitted by an optical filter.

The phenomenon of optical interference, which causes modifications in the transmitted and reflected intensities of light, occurs when two or more beams of light are superposed. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil. The principle of superposition states that the resultant amplitude is the sum of the amplitudes of the individual beams.

One important practical application for interference effects in thin films involves the production of coated optical surfaces. If a film of a transparent substance is deposited on glass, for example, with a refractive index which is properly specified relative to the refractive index of the glass and with a thickness which is one quarter of a particular wavelength of light in the film, the reflection of that wavelength of light from the glass surface can be almost completely suppressed. The light which would otherwise be reflected is not absorbed by a nonreflecting film; rather, the energy in the incident light is redistributed so that a decrease in reflection is accompanied by a concomitant increase in the intensity of the light which is transmitted.

Considerable improvements have been achieved in the antireflective performance of such films by using a composite film having two or more superimposed layers. In theory, it is possible with this approach to design a wide range of multiple-layer interference coatings for obtaining a great variety of transmission and reflection spectrums. This has led to the development of a large number of new optical devices making use of complex spectral filter structures. Antireflection coatings, laser dielectric mirrors, television camera edge filters, optical bandpass filters, and band-rejection filters are some examples of useful devices which employ thin-film interference coatings.

One type of bandpass filter is the cavity filter, which is a Fabry-Perot interferometer made with thin films. The cavity in the filter is a spacer layer which has an optical thickness equal to one half (or an integral multiple of one half) the wavelength of the light to be transmitted by the filter. The spacer layer is sandwiched between two reflecting layers which are made up of quarter-wave stacks of alternating high and low index layers, each layer having an optical thickness of one fourth the passband wavelength. Such a filter transmits at the wavelength for which the cavity thickness is a halfwave. Other wavelengths are reflected, thereby producing a bandpass filter.

The spacer layer essentially induces transmission through the two reflecting layers, which are tuned to reflect highly at the passband wavelength. This performance may be explained by the concept of absentee layers. Any halfwave layer (or a higher multiple of a halfwave layer) behaves in a multilayer stack as though it were absent. Therefore, if the spacer layer were removed in a cavity filter, the adjacent quarterwave layers on either side would effectively form another halfwave layer. Since this effective layer would also be a halfwave layer, this layer may also be denoted absentee and may be considered removed. This analysis can be continued by pairing quarterwave layers on either side of the cavity layer until only the substrate is left. Consequently, the transmittance of the cavity filter at the passband wavelength is theoretically the same as a bare transparent substrate.

The reflectance curve for an actual cavity filter, however, is considerably less ideal than the absentee layer theory implies. One reason for this is that the standing wave E field within the filter exhibits some high peaks, particularly for a narrowband filter, at the interfaces between the spacer layer and the adjacent reflecting layers. If there is high absorption or damage sites at these interfaces, a considerable amount of the passband energy can be absorbed in the filter rather than being transmitted. This effect is exacerbated by the need for halfwave layers in the cavity layer, since in the deposition process the thicker halfwave layers tend to develop more irregularities at their interfaces than do thinner layers. These irregularities further contribute to the absorption of the passband wavelengths in prior art cavity filters and make high transmission particularly difficult to attain in a narrow bandwidth filter.

SUMMARY OF THE INVENTION

A method of designing a thin film optical bandpass filter, for transmitting light in a narrow band of wavelengths centered about a bandpass wavelength, begins by defining a first quarter-wave stack, including a first plurality of layers each having an optical thickness equal to one fourth the bandpass wavelength. A second quarter-wave stack is defined to include a second plurality of layers each having an optical thickness equal to one fourth the bandpass wavelength. Next, a cavity layer is defined with an optical thickness equal to an integral multiple of one half the bandpass wavelength, to be interposed between the first quarter-wave stack and the second quarter-wave stack. The cavity layer is then replaced with a partitioned cavity, including at least one layer of a first optical material with a relatively high index of refraction and at least one layer of a second optical material with a relatively low index of refraction. The partitioned cavity layers, which initially have a total optical thickness equivalent to the optical thickness of the cavity layer, are adjusted in physical thickness to center the transmission peak of the filter on the bandpass wavelength.

In a more particular embodiment, the step of defining the cavity includes specifying the high index and low index layers in the cavity such that maxima in the electric field intensity profile for the filter do not occur at the layer interfaces in the filter. Another alternative involves defining a cavity with one or more hypothetical layers, each layer being a layer of the high index material having an optical thickness of half the bandpass wavelength or a layer of the low index material having an optical thickness of half the bandpass wavelength, then partitioning each hypothetical layer into at least one layer of the high index material and at least one layer of the low index material.

The invention also contemplates an analogous method of making a thin film optical bandpass filter and the thin film filter itself.

Another thin film filter includes first, second, and third quarter-wave stacks, with a first partitioned cavity disposed between the first quarter-wave stack and the second quarter-wave stack and a second partitioned cavity disposed between the second quarter-wave stack and the third quarter-wave stack.

In more particular embodiments, the cavity of this filter may include a layer of the high index material having a thickness of approximately 0.445 H, where H is one fourth the bandpass wavelength in the high index material, a layer of the low index material having a thickness of approximately 0.445 L, where L is one fourth the bandpass wavelength in the low index material, and a layer of the high index material having a thickness of approximately H. In addition, the cavity may include a layer of the high index material having a thickness of approximately 0.602 H, a layer of the low index material having a thickness of approximately 0.602 L, and a layer of the high index material having a thickness of approximately 0.602 H. Also, each cavity may include a layer of the low index material having a thickness of approximately 0.728 L, a layer of the low index material having a thickness of approximately 0.728 H, and a layer of the high index material having a thickness of approximately 0.728 L.

Each cavity may further include a pair of symmetrical three layer combinations of layers of the low index material and the high index material such that each three layer combination is approximately equivalent in optical thickness to a layer having one fourth the bandpass wavelength at a preselected refractive index. In particular, the latter embodiment may include a cavity having a layer of the low index material having a thickness of approximately 0.225 L, a layer of the high index material having a thickness of approximately 0.532 H, a layer of the low index material having a thickness of approximately 0.45 L, a layer of the high index material having a thickness of approximately 0.532 H and a layer of the low index material having a thickness of approximately 0.225 L.

DESCRIPTION OF THE INVENTION

This invention makes possible the fabrication of narrow bandwidth thin film optical bandpass filters with exceptionally high transmission for the bandpass wavelengths. The invention pertains to thin film optical bandpass filters which transmit light in a narrow band of wavelengths centered about a bandpass wavelength. In general, the inventive process for designing such a filter begins by defining a first quarter-wave stack, including a plurality of layers each having an optical thickness equal to one fourth the bandpass wavelength. Next, a second quarter-wave stack, similar to the first, is defined.

A cavity layer, having an optical thickness equal to an integral multiple of one half the bandpass wavelength, is defined to be interposed between the first quarter-wave stack and the second quarter-wave stack. In an outstanding feature of this invention, the cavity layer is then replaced with a partitioned cavity which, like the cavity of prior art filters, has an optical thickness equal to an integral multiple of one half the bandpass wavelength. The partitioned cavity of this invention, however, includes at least one layer of a first optical material with a relatively high index of refraction and at least one layer of a second optical material with a relatively low index of refraction. The partitioned cavity layers are selected to have a total optical thickness equivalent to the optical thickness of the cavity layer. Finally, the physical thickness of each partitioned cavity layer is adjusted to center the transmission peak of the filter on the bandpass wavelength.

As those skilled in the art will appreciate, it may be convenient for the quarter-wave stacks to be made of alternating layers of the same first and second optical materials used in the partitioned cavity layers, but it is not essential to this invention to do so.

For the purpose of comparing partitioned cavity filters made using this invention to the cavity filters known in the prior art, a conventional double cavity filter was selected as a baseline for comparison. The theoretical baseline filter was defined as having a first quarter-wave stack consisting of a quarter-wave low index layer, four pairs of low index-high index quarter-wave layers, and a quarter-wave low layer; a first cavity with a half-wave high index spacer layer; a second quarter-wave stack with a quarter-wave low layer and nine pairs of high-low quarter-wave layers; a second cavity consisting of a second half-wave high index spacer layer; and a third quarter-wave stack, including a quarter-wave low index layer and four pairs of high-low quarter-wave layers, all on a transparent substrate.

Figure 1:
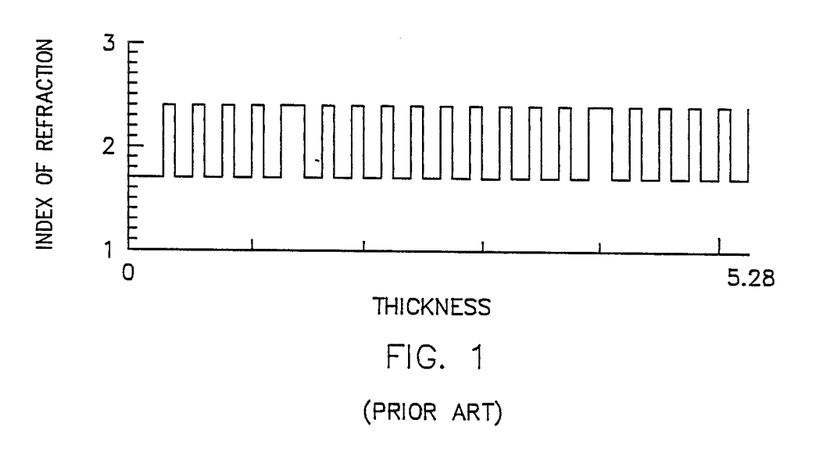
FIG. 1 is a plot of the index of refraction of a baseline prior art thin film optical bandpass filter as a function of the thickness of the filter, illustrating the layer configuration of the baseline filter.
Figure 2:
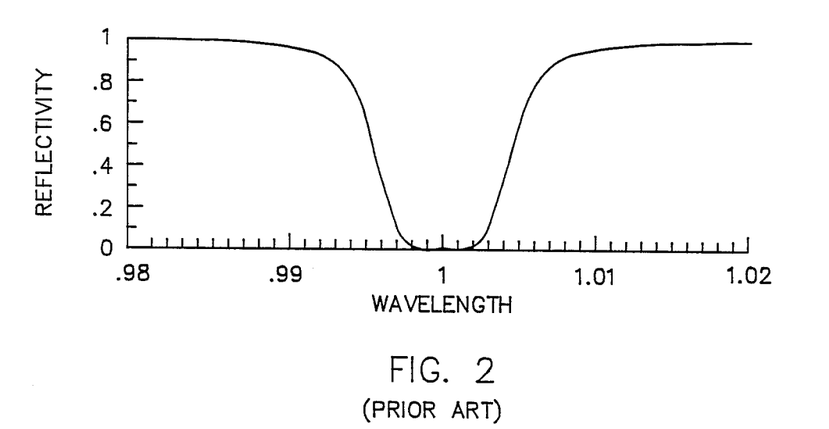
FIG. 2 is a plot of reflectivity as a function of wavelength, illustrating the calculated spectral performance of the baseline filter.
Figure 3:
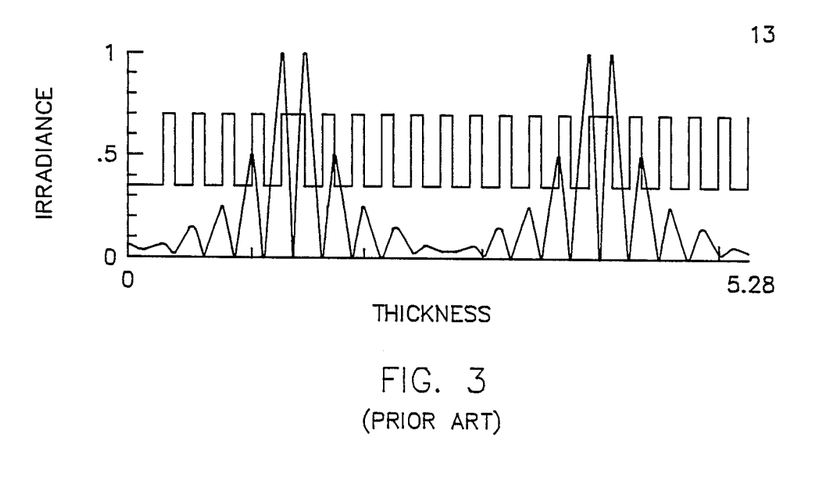
FIG. 3 is a plot of the calculated E-field intensity pattern for the baseline design, with a plot of the filter layer structure superimposed.

Using the conventional notation for thin film filters, the layer structure of this baseline filter is denoted as L(LH)$^4$LSL(HL)$^9$SL(HL)$^4$Sub. In this design comparison, L was chosen to represent a quarter-wave layer with a low refractive index of n=1.7 and H represents a quarter-wave layer having a higher index n=2.4 on a substrate of index n=2.4. The layer configuration of this baseline filter is illustrated in FIG. 1, which is a plot of the index of refraction of the filter on the vertical axis as a function of depth in (thickness of) the filter, which is plotted along the horizontal axis. FIG. 2 is a plot of reflectivity on the vertical axis as a function of wavelength on the horizontal axis, illustrating the calculated spectral performance of the baseline filter, with a wavelength of 1.00 arbitrarily selected as the center of the passband for the filter. The units for thickness and wavelength in the Figures are arbritary, but are related, i.e., if the passband shown in FIG. 2 was at 1 micron the thickness of the filter shown in FIG. 1 would be 5.28 microns. The calculated E-field intensity pattern for the baseline design is illustrated in FIG. 3, which is a plot of irradiance (vertical axis) as a function of thickness in the filter (horizontal axis), with a plot of the filter layer structure (from FIG. 1) superimposed so that the E-field distribution which occurs in the filter when incident light passes through the filter can be correlated to the thin film layer structure.

Figure 4:
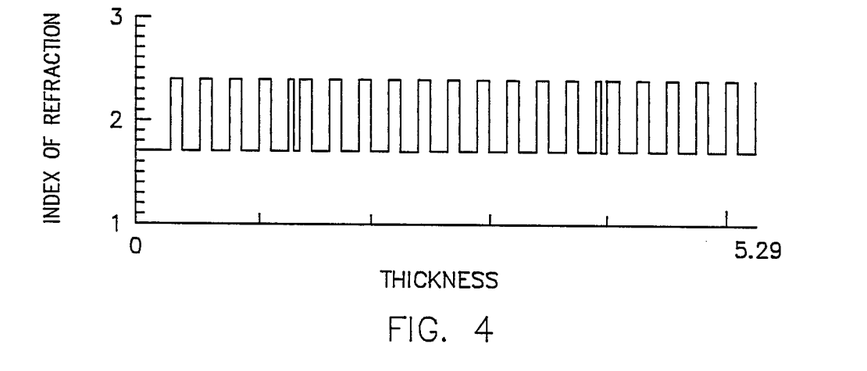
FIGS. 4-6 are plots analogous to FIGS. 1-3 for a first embodiment of the invention.
Figure 5:
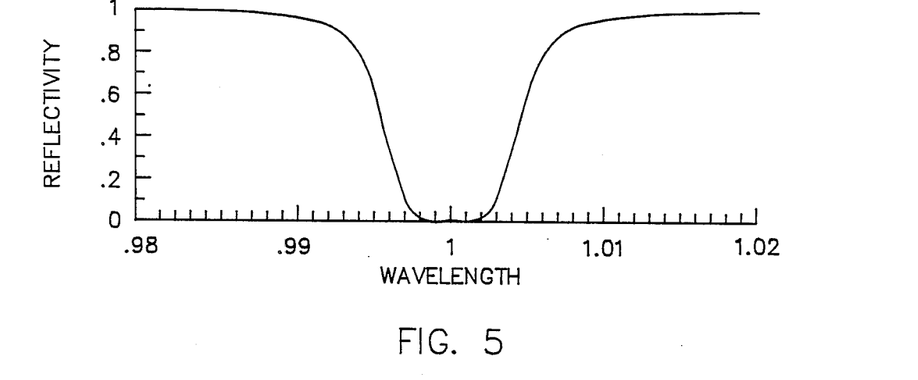
Figure 6:
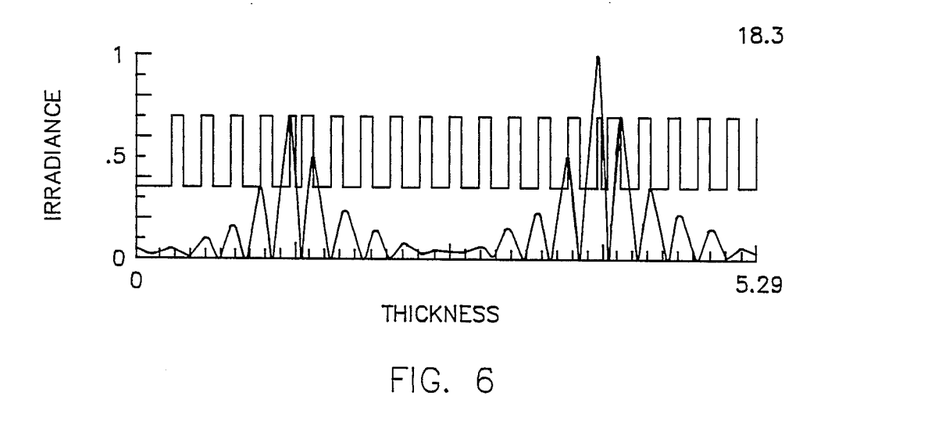

As a first example of the use of the present invention to improve upon the baseline design, the high index half-wave spacer layers which constitute the cavities in the baseline design were each replaced with a quarter-wave high layer, an eighth-wave low layer, and an eighth-wave high layer. Because this high-low-high "equivalent" of the high index half-wave layer does not have the same optical thickness as the layer it replaces, this substitution shifts the filter's transmission peak to a longer wavelength. To compensate for this shift, the two eighth-wave layers were made slightly thinner to shift the transmission peak back to the 1.00 center wavelength. This compensation step shifted the cavity layers to thicknesses of S=0.445H 0.445L H. In plots analogous to FIGS. 1–3, the calculated layer configuration, spectral performance, and E-field intensity pattern for this partitioned cavity design are illustrated in FIGS. 4, 5, and 6, respectively.

Figure 7:
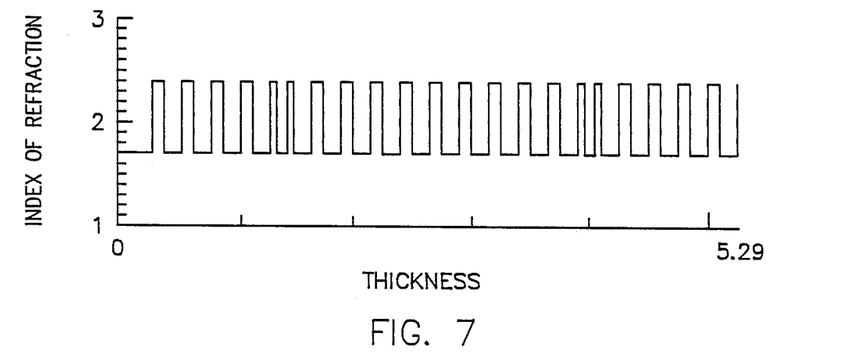
FIGS. 7-9 are analogous plots for another filter constructed according to the invention.
Figure 8:
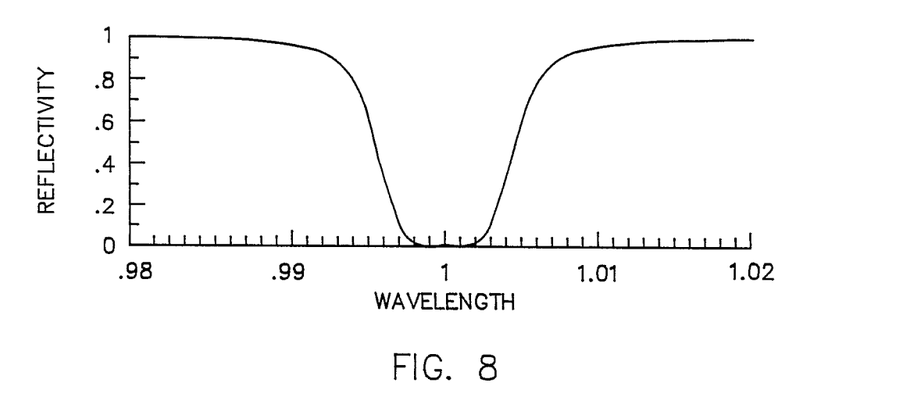
Figure 9:
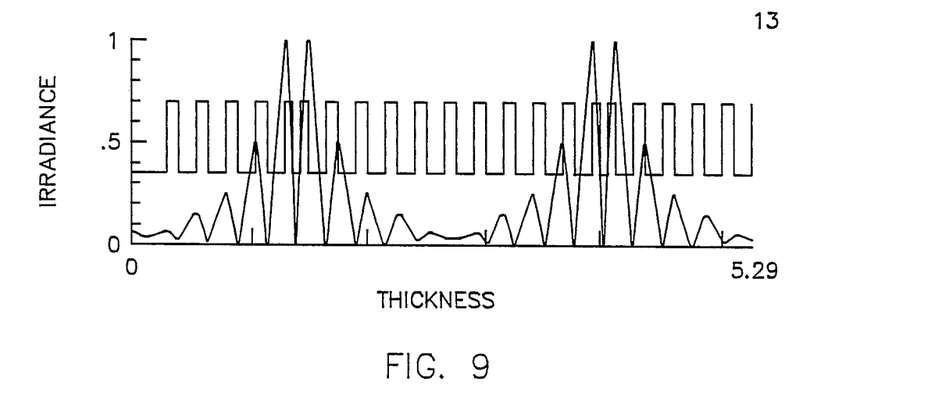

Another embodiment of the invention uses a high-low-high combination cavity with layers of equal optical thickness. As with the first example, it was necessary to reduce the optical thickness of each layer, in this case to 0.602 of a quarter wave instead of two thirds, i.e., S=0.602(HLH), to maintain the bandpass on center at 1.00. The calculated layer configuration, spectral performance, and E-field intensity for this embodiment are illustrated in FIGS. 7, 8, and 9.

Figure 10:
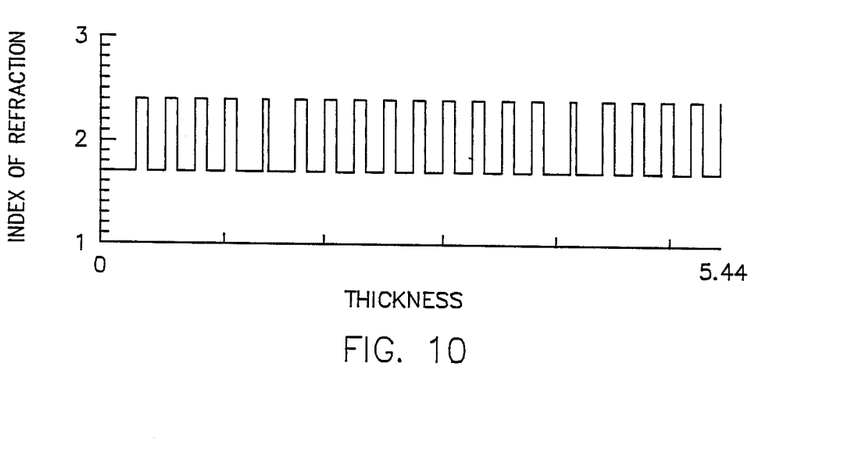
FIGS. 10-12 are similar plots for a low-high-low cavity embodiment of the invention.
Figure 11:
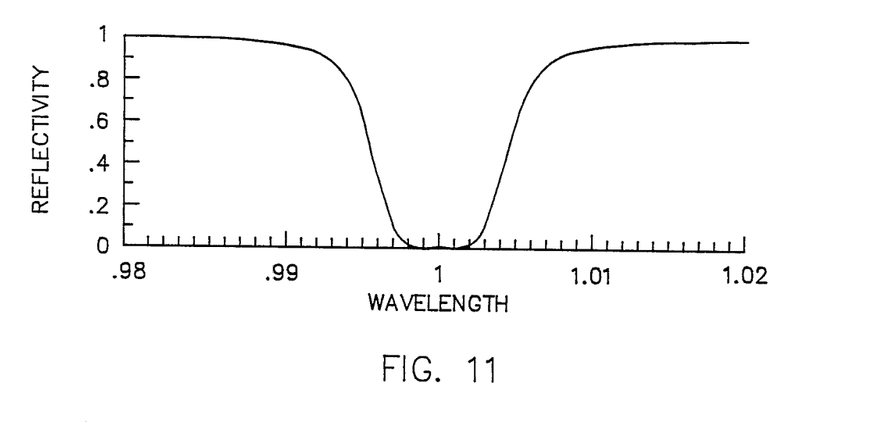
Figure 12:
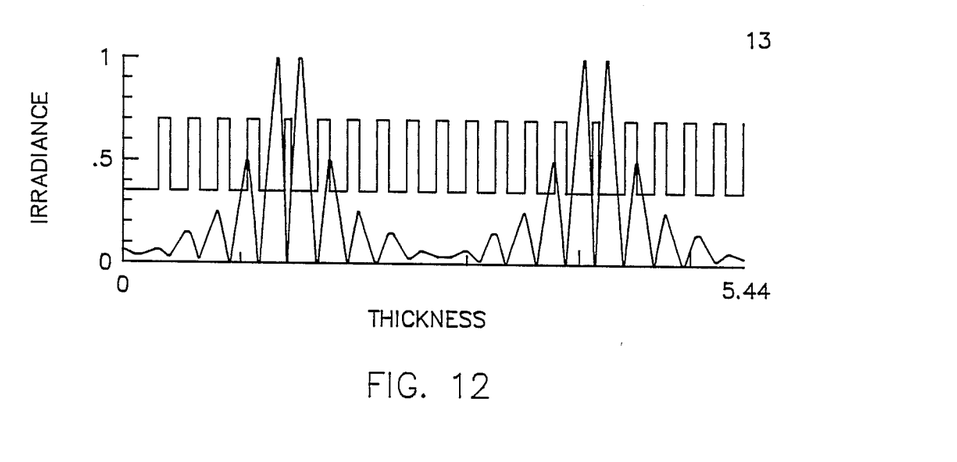

A low-high-low cavity embodiment, with each layer (adjusted for a bandpass centered at 1.00) 0.728 of a quarter-wave (S=0.728(LHL)), is illustrated in FIGS. 10, 11, and 12. In this embodiment, the quarter-wave stack layers adjacent to the cavity layer are low-index layers, which combine with the low-index layers of the cavity. The E-field intensity peaks, as shown in FIG. 12, are no longer at the layer interfaces, but are positioned inside the low-index layers. Nevertheless, this embodiment has the same number of layers as the baseline design. The flexibility provided the filter designer by this invention, which allows the removal of the intensity peaks from the interfaces, is a significant advantage since it helps to achieve a high transmission value for the passband wavelengths of the filter.

Figure 13:
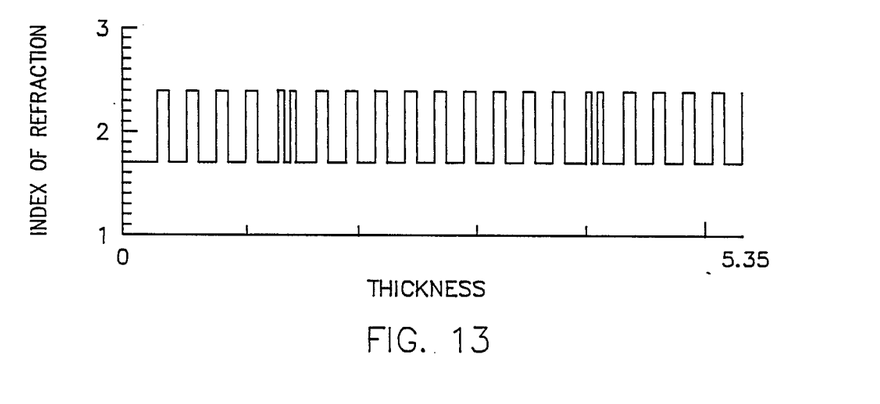
FIGS. 13-15 depict similar plots for a Herpin equivalent embodiment of the invention.
Figure 14:
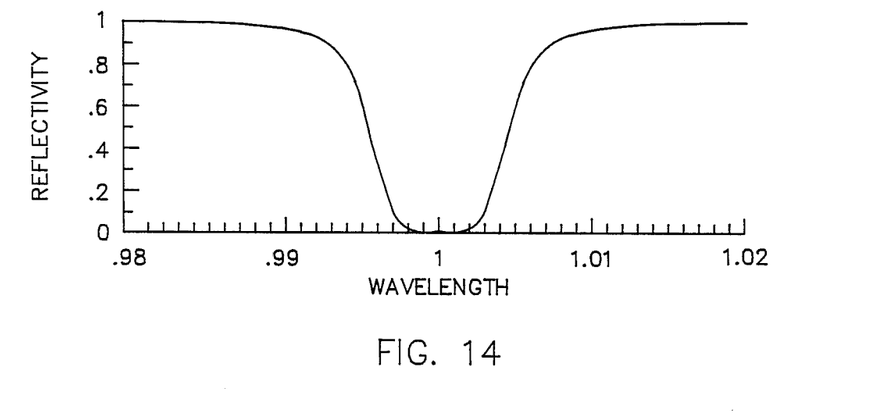
Figure 15:
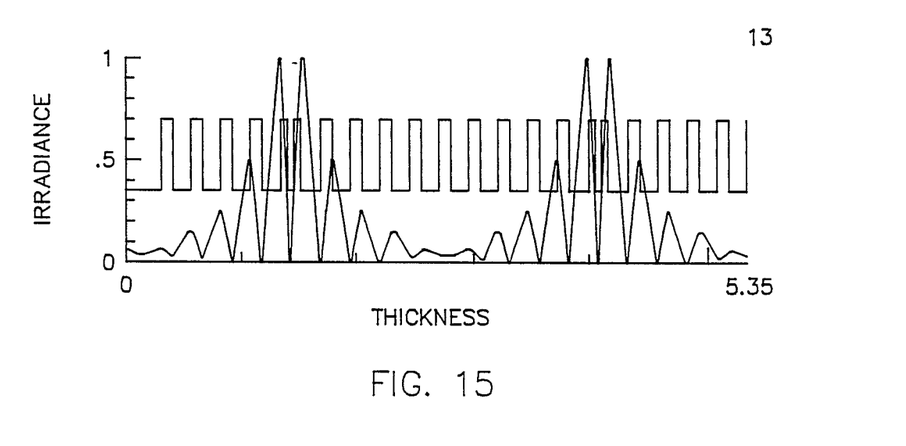

A fourth embodiment uses the concept of Herpin equivalents (see Southwell, U.S. Pat. No. 4,583,822; Epstein, The Design of Optical Filters, Journal of the Optical Society of America, Volume 42, Page 806 1952)) to replace the cavity layers. In implementing a Herpin equivalent design, it is important to note that a half-wave layer, as discussed above, is "absentee" and, therefore, equivalent to a zero thickness layer or to a half-wave layer of any other index. To get around this problem with the exemplary baseline design, a cavity layer with an intermediate refractive index of 2.2 was selected and was divided into two quarter-wave layers placed side by side. Each of these quarter-wave layers was replaced by a symmetrical low-high-low configuration to which it was equivalent, as determined by the Herpin equivalent approach. This procedure yielded a cavity layer structure of S=0.225L 0.532H 0.45L. The layer configuration for this embodiment is plotted in FIG. 13, while the calculated spectral performance is depicted in FIG. 14 and the E-field intensities in FIG. 15.

All of the partitioned cavity enhancements to the baseline design described above demonstrate essentially the same spectral performance, but the technique of this invention gives the filter designer the freedom to position the peaks of the E-field intensity at optimum locations within the filter layer structure. The design of FIG. 10, for example, positions nulls in the E-field intensity near the interfaces in the cavity regions, while the baseline design has the E-field intensity peaks at the layer interfaces. This ability to selectively position the intensity peaks away from the interfaces can be an important factor in maximizing bandpass transmission if absorption is greatest at the interfaces, or if absorption is greater in one of the two materials used in depositing the filter layers.

The ability to fabricate cavity layers out of layers thinner than half-wave layers is another important advantage of the invention. The amount of roughness on the surface of a thin film layer, which contributes to optical loss in the filter, tends to increase as the thickness of the layer increases. Substituting thinner layers for the half-wave layers in the cavity layers helps to reduce the surface roughness. This invention can thus be used to maximize the performance of a cavity filter. To do this, the cavity layers are divided into equivalent layers made as thin as can be measured and deposited with the equipment being used. These layers are then adjusted in thickness to ensure that the peak transmission of the filter is centered at the desired wavelength, and the specified layers are then deposited to fabricate the partitioned cavity filter.

Figure 16:
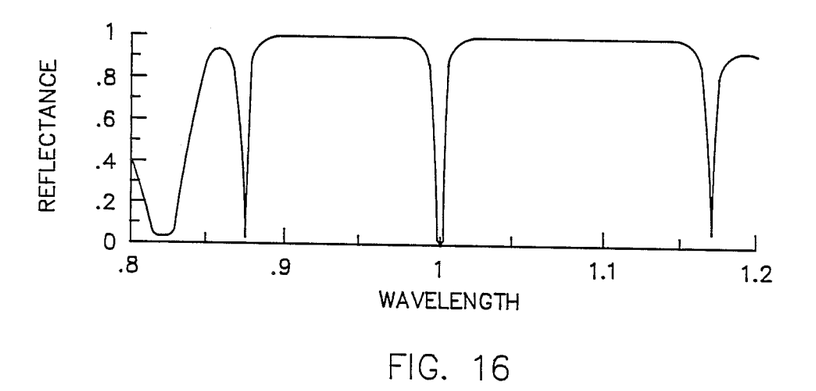
FIG. 16 depicts a calculated spectral performance for the baseline design, assuming error-free deposition.
Figure 17:
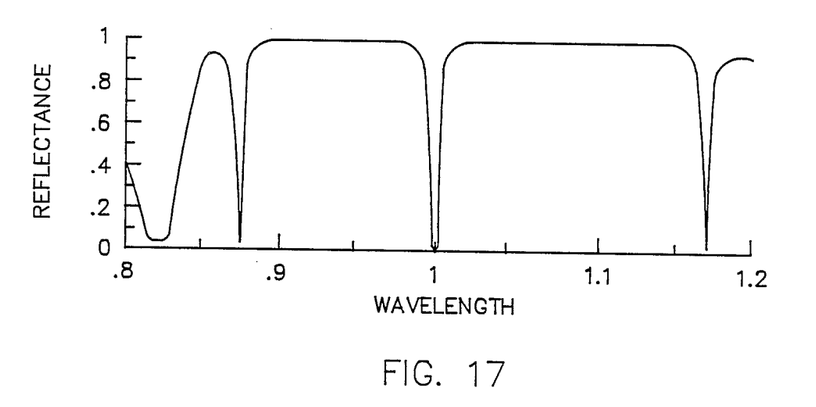
FIG. 17 is similar to FIG. 16 and depicts calculated performance for an error-free design according to FIGS. 13-15.

The partitioned cavity design of this invention also can be used to reduce the degradation in filter performance caused by random errors in the fabrication process. This advantage can be demonstrated by assuming that random errors are made in the deposited thickness of each layer in both the baseline prior art double cavity filter of FIGS. 1–3 and the partitioned cavity embodiment depicted in FIGS. 13–15, then comparing the calculated performance for each of the resulting filters to each other and to the results for the idealized designs. FIG. 16 depicts the calculated spectral performance for the baseline design, assuming error-free deposition, while FIG. 17 illustrates the predicted performance for an error-free deposition of the partitioned cavity design.

Figure 18:
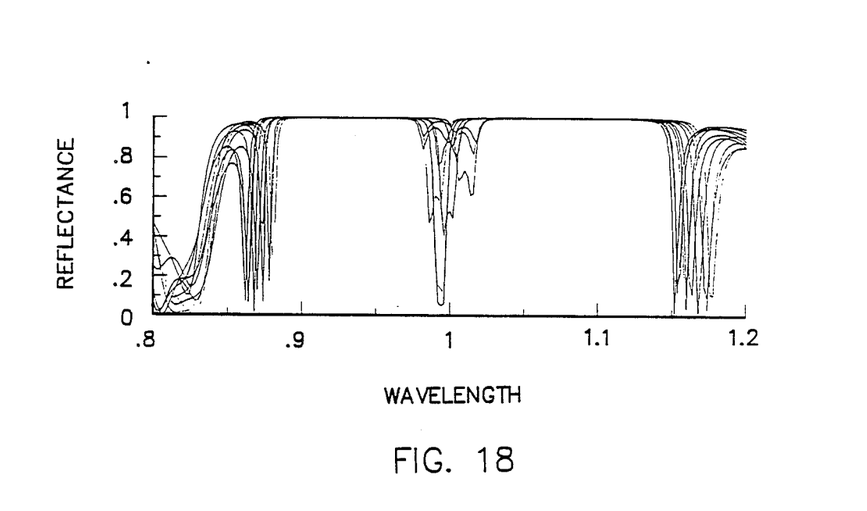
FIGS. 18 and 19 are similar to FIGS. 16 and 17, but illustrate the calculated performance plots for ten configurations of each filter design, assuming uniform random thickness errors in each layer.
Figure 19:
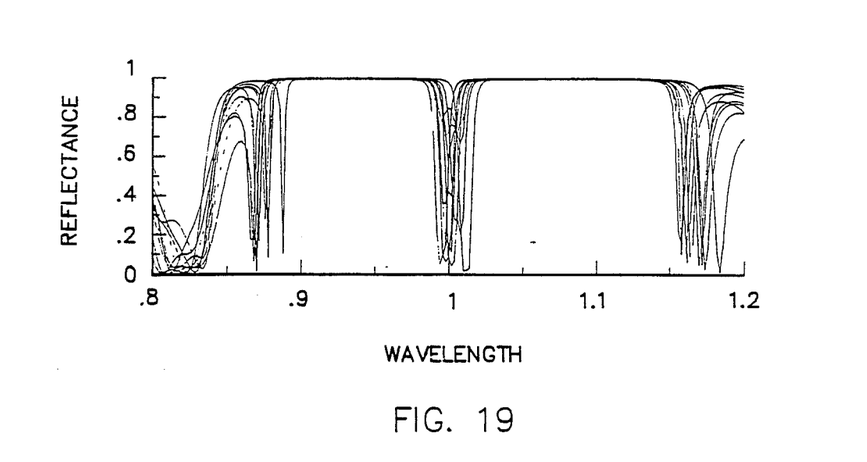

Each layer in each of these designs was assigned a + or −5% uniform random thickness error. The calculated performance plots for ten such configurations with simulated thickness errors are shown superimposed in FIG. 18 for the baseline configuration and in FIG. 19 for the partitioned-cavity configuration. These results indicate that the partitioned-cavity design of this invention has a higher probability of producing acceptable filter performance.

Another useful advantage of a partitioned cavity filter is that it is more amenable to an ongoing thickness-error compensation scheme during fabrication than are the cavity filter designs of the prior art. To be realized, this advantage requires an error-compensation scheme in which the thickness of the most recently deposited layer can be more accurately measured than a currently depositing layer can be terminated at the prescribed thickness. The error-compensation algorithm consists of measuring the optical thickness of the immediately preceding deposited layer and adjusting the prescribed thickness of the current layer to compensate for any optical-thickness error in the previous layer. Various error compensation schemes known in the art can be used with the present invention. An exemplary approach, for example, is discussed in U.S. patent application No. 023,587, filed Mar. 9, 1987.

Figure 20:
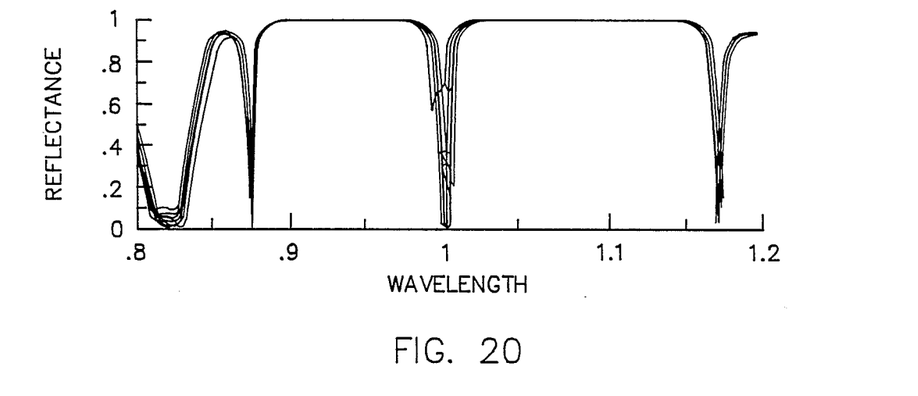
FIG. 20 illustrates superimposed performance results calculated for 10 iterations of the baseline design fabricated assuming + or −5% uniform thickness errors in the layers and incorporating a thickness adjustment made on each succeeding layer to compensate for measured error in the thickness of the preceding layer.
Figure 21:
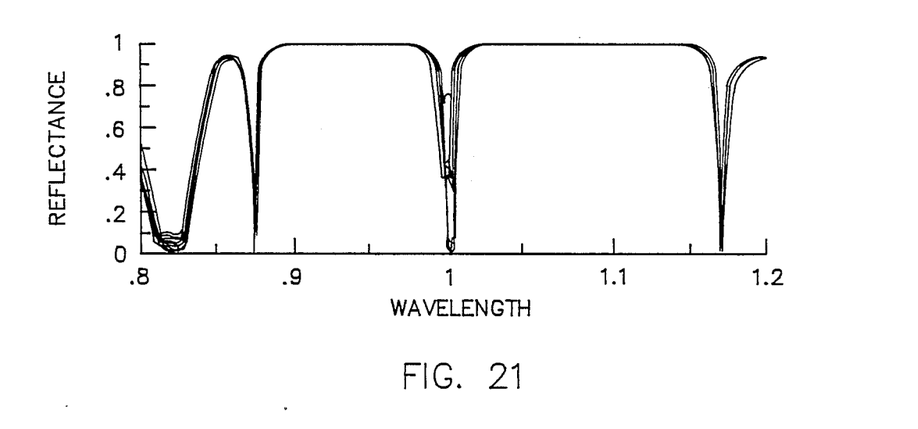
FIG. 21 depicts similar calculated performance results for the partitioned cavity design.

FIG. 20 illustrates superimposed performance results calculated for 10 iterations of the baseline design fabricated assuming + or −5% uniform thickness errors in the layers. These designs also incorporate a thickness adjustment made on each succeeding layer to compensate for measured error in the thickness of the preceding layer. The plots in FIG. 21 depict similar calculated performance results for the partitioned cavity design. The plots show that the error compensation scheme improves both designs, but the expected yield is higher for the partitioned cavity design.

Figure 22:
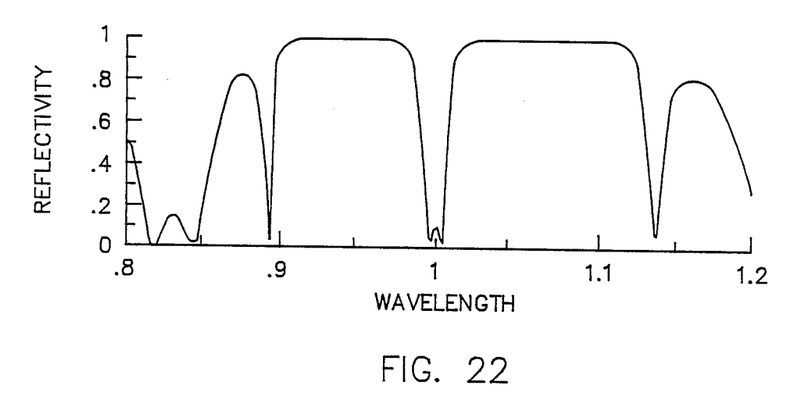
FIG. 22 illustrates the predicted performance for a filter using a Herpin equivalent cavity designed for a bandpass at 1 micron.
Figure 23:
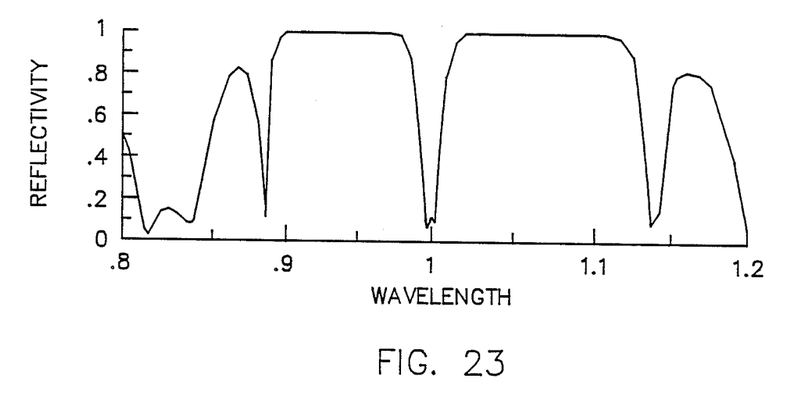
FIG. 23 depicts the measured spectral performance of the fabricated filter employing a Herpin equivalent cavity designed for a bandpass at 1 micron.

The technique of this invention was also tested by fabricating some partitioned cavity filters according to the invention. One embodiment selected for fabrication used a Herpin equivalent cavity with a layer structure S=0.315L 0.357H 0.63L 0.357H 0.351L and an overall design of L(LH)$^4$LSL(LH)$^9$LSL(LH)$^4$L Sub, where L represents a quarter-wave layer of index 1.7, H was a quarter-wave of index 2.2, and the substrate had an index of 3.48. The filter was fabricated using $PbF_2$ and ZnS as the layer materials and Si as the substrate. The $PbF_2$ was laser evaporated, while the ZnS was thermally evaporated. The layer thicknesses were monitored by directing a laser ellipsometer beam at the filter and detecting the laser light reflected from the layer structure. After the deposition of each layer was terminated, a careful measurement was made to determine the thickness of the layer just completed. Based on this measurement, the target thickness of the next layer was adjusted according to the error compensation scheme described above. The bandpass wavelength was centered at 1.5 um, but the results were scaled down to 1 um for comparison with the calculated design performance. FIG. 22 illustrates the predicted performance for this design, while FIG. 23 depicts the measured spectral performance of the fabricated filter, demonstrating good agreement with the theoretical performance.

The preferred embodiments of this invention have been illustrated and described above. Modifications and additional embodiments, however, will undoubtedly be apparent to those skilled in the art. Many combinations of high and low index layers other than those specific examples discussed herein, for example, may be envisioned in applying this invention to particular cavity filter designs. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference: Southwell, U.S. Pat. No. 4,583,822; Hall, et al., U.S. patent application No. 023,587, filed Mar. 9, 1987; and Epstein, The Design of Optical Filters, Journal of the Optical Society of America, Volume 42, Page 806 1952).

We claim:

1. A method of designing a thin film optical bandpass filter for transmitting light in a narrow band of wavelengths centered about a bandpass wavelength, comprising the steps of:

defining a first quarter-wave stack, including a first plurality of layers each having an optical thickness equal to one fourth the bandpass wavelength;

defining a second quarter-wave stack, including a second plurality of layers each having an optical thickness equal to one fourth the bandpass wavelength;

defining a cavity layer, having an optical thickness equal to an integral multiple of one half the bandpass wavelength, to be interposed between the first quarter-wave stack and the second quarter-wave stack;

replacing the cavity layer with a partitioned cavity, including at least one layer of a first optical material with a relatively high index of refraction and at least one layer of a second optical material with a relatively low index of refraction, the partitioned cavity layers having a total optical thickness equivalent to the optical thickness of the cavity layer; and adjusting the physical thickness of each partitioned cavity layer to center the transmission peak of the filter on the bandpass wavelength.

2. The method of claim 1, wherein the step of replacing the cavity layer further comprises:

specifying the high index and low index layers in the partitioned cavity such that maxima in the electric field intensity profile for the filter do not occur at the layer interfaces in the filter.

3. The method of claim 1, wherein the step of replacing the cavity layer further comprises:

defining a cavity with one or more hypothetical layers, each layer being a layer of the high index material having an optical thickness of half the bandpass wavelength or a layer of the low index material having an optical thickness of half the bandpass wavelength; and partitioning each hypothetical layer into at least one layer of the high index material and at least one layer of the low index material.

4. A method of making a thin film optical bandpass filter for transmitting light in a narrow band of wavelengths centered about a bandpass wavelength, comprising:

depositing a first quarter-wave stack on a substrate, the first quarter-wave stack including a first plurality of layers each having an optical thickness equal to one fourth the bandpass wavelength;

depositing a partitioned cavity on the first quarter-wave stack, the cavity including at least one layer of a first optical material with a relatively high index of refraction and at least one layer of a second optical material with a relatively low index of refraction, the total optical thickness of the partitioned cavity layers being nominally an integral multiple of one half the bandpass wavelength, the physical thickness of each cavity layer being adjusted so that the transmission peak of the filter is centered on the bandpass wavelength; and depositing a second quarter-wave stack on the partitioned cavity, the second quarter-wave stack including a second plurality of layers each having an optical thickness equal to one fourth the bandpass wavelength.

5. The method of claim 4, wherein the step of depositing a partitioned cavity further comprises:

specifying the thickness of each high index and low index layer in the cavity such that maxima in the electric field intensity profile for the filter do not occur at the layer interfaces in the filter.

6. The method of claim 4, wherein the step of depositing a partitioned cavity further comprises:

depositing the partioned cavity layers such that each layer has an optical thickness of half the bandpass wavelength.

7. A thin film optical bandpass filter for transmitting light in a narrow band of wavelengths centered about a bandpass wavelength, comprising:

a first quarter-wave stack, including a first plurality of layers each having an optical thickness equal to one fourth the bandpass wavelength;

a second quarter-wave stack, including a second plurality of layers each having an optical thickness equal to one fourth the bandpass wavelength;

a partitioned cavity disposed between the first quarter-wave stack and the second quarter-wave stack, the cavity including at least one layer of a first optical material with a relatively high index of refraction and at least one layer of a second optical material with a relatively low index of refraction, the total optical thickness of the partitioned cavity layers being nominally an integral multiple of one half the bandpass wavelength, the physical thickness of each cavity layer being adjusted so that the transmission peak of the filter is centered on the bandpass wavelength.

8. The filter of claim 7, wherein the thickness of each high index and low index layer in the partitioned cavity is such that maxima in the electric field intensity profile for the filter do not occur at the layer interfaces in the filter.

9. The filter of claim 7, wherein the cavity further comprises one or more hypothetical layers, each hypothetical layer being a layer of the high index material having an optical thickness of half the bandpass wavelength or a layer of the low index material having an optical thickness of half the bandpass wavelength, each hypothetical layer being partitioned into at least one layer of the high index material and at least one layer of the low index material.

10. A thin film optical bandpass filter for transmitting light in a narrow band of wavelengths centered about a bandpass wavelength, comprising:

a first quarter-wave stack, including a first plurality of layers each having an optical thickness equal to one fourth the bandpass wavelength;

a second quarter-wave stack, including a second plurality of layers each having an optical thickness equal to one fourth the bandpass wavelength;

a third quarter-wave stack, including a third plurality of layers each having an optical thickness equal to one fourth the bandpass wavelength;

a first partitioned cavity disposed between the first quarter-wave stack and the second quarter-wave stack, the first cavity including at least one layer of a first optical material with a relatively high index of refraction and at least one layer of a second optical material with a relatively low index of refraction, the total optical thickness of the first partitioned cavity being nominally an integral multiple of one half the bandpass wavelength, the physical thickness of each cavity layer therein being adjusted so that the transmission peak of the filter is centered on the bandpass wavelength; and a second partitioned cavity disposed between the second quarter-wave stack and the third quarter-wave stack, the second cavity including at least one layer of the first optical material and at least one layer of the second optical material, the total optical thickness of the second partitioned cavity being nominally an integral multiple of one half the bandpass wavelength, the physical thickness of each cavity layer therein being adjusted so that the transmission peak of the filter is centered on the bandpass wavelength.

11. The filter of claim 10, wherein each partitioned cavity further comprises:

a layer of the high index material having a thickness of approximately 0.445 H, where H is one fourth the bandpass wavelength in the high index material;

a layer of the low index material having a thickness of approximately 0.445 L, where L is one fourth the bandpass wavelength in the low index material; and a layer of the high index material having a thickness of approximately H.

12. The filter of claim 10, wherein each partitioned cavity further comprises:

a layer of the high index material having a thickness of approximately 0.602 H, where H is one fourth the bandpass wavelength in the high index material;

a layer of the low index material having a thickness of approximately 0.602 L, where L is one fourth the bandpass wavelength in the low index material; and a layer of the high index material having a thickness of approximately 0.602 H.

13. The filter of claim 10, wherein each partitioned cavity further comprises:

a layer of the low index material having a thickness of approximately 0.728 L, where L is one fourth the bandpass wavelength in the low index material;

a layer of the low index material having a thickness of approximately 0.728 H, where H is one fourth the bandpass wavelength in the high index material; and a layer of the high index material having a thickness of approximately 0.728 L.

14. The filter of claim 10, wherein each partitioned cavity further comprises a pair of symmetrical three layer combinations of layers of the low index material and the high index material such that each three layer combination is approximately equivalent in optical thickness to a layer having one fourth the bandpass wavelength at a preselected refractive index.

15. The filter of claim 14, wherein each partitioned cavity further comprises:

a layer of the low index material having a thickness of approximately 0.225 L, where L is one fourth the bandpass wavelength in the low index material;

a layer of the high index material having a thickness of approximately 0.532 H, where H is one fourth the bandpass wavelength in the high index material;

a layer of the low index material having a thickness of approximately 0.45 L;

a layer of the high index material having a thickness of approximately 0.532 H; and a layer of the low index material having a thickness of approximately 0.225 L.

* * * * *